(12) United States Patent
Eliáš et al.

(10) Patent No.: US 8,997,075 B2
(45) Date of Patent: Mar. 31, 2015

(54) SYSTEM AND METHOD FOR DYNAMIC CLASS MANAGEMENT

(71) Applicant: Red Hat, Inc., Raleigh, NC (US)

(72) Inventors: Filip Eliáš, Vysni Lhoty (CZ); Filip Nguyen, Brno (CZ)

(*) Notice: Subject to any disclaimer, the term of this patent is extended or adjusted under 35 U.S.C. 154(b) by 43 days.

(21) Appl. No.: 13/949,151

(22) Filed: Jul. 23, 2013

(65) Prior Publication Data

US 2015/0033215 A1    Jan. 29, 2015

(51) Int. Cl.
    *G06F 9/44*    (2006.01)
    *G06F 9/445*    (2006.01)

(52) U.S. Cl.
    CPC .............. *G06F 9/44521* (2013.01); *G06F 8/65* (2013.01)
    USPC ............................ 717/166; 717/172; 717/173

(58) Field of Classification Search
    CPC ................................ G06F 9/44521; G06F 8/65
    USPC .................................................. 717/168–178
    See application file for complete search history.

(56) References Cited

U.S. PATENT DOCUMENTS

| | | | |
|---|---|---|---|
| 6,279,030 B1 | 8/2001 | Britton et al. | |
| 6,745,386 B1 * | 6/2004 | Yellin | 717/166 |
| 8,296,402 B2 | 10/2012 | Navarro | |
| 8,312,451 B2 | 11/2012 | Poole et al. | |
| 8,516,466 B2 * | 8/2013 | Huber et al. | 717/154 |
| 2003/0200350 A1 * | 10/2003 | Kumar et al. | 709/315 |
| 2008/0184212 A1 * | 7/2008 | Lee et al. | 717/148 |
| 2009/0172637 A1 | 7/2009 | Parikh | |
| 2009/0204963 A1 * | 8/2009 | Swart et al. | 718/1 |

FOREIGN PATENT DOCUMENTS

| | | |
|---|---|---|
| CN | 101159763 A | 4/2008 |
| CN | 101834885 A | 9/2010 |

OTHER PUBLICATIONS

IBM, WebSphere Application Server V7: Understanding Class Loaders, IBM Corp. 2009, pp. 1-34.*
IBM, Method and Apparatus for Dynamic Inclusion of Profiling Functionality's in Java Classes, IP.com, Apr. 2, 2004, pp. 1-5.*
IBM, Handling Compile-Time Class Dependencies in the Presence of Custom Class Loaders, IP.com, Feb. 8, 2010, pp. 1-4.*

(Continued)

*Primary Examiner* — Satish Rampuria
(74) *Attorney, Agent, or Firm* — Haynes and Boone LLP (57) ABSTRACT

A system and method of dynamic class management includes starting a skeleton application by loading a main class of the skeleton application and executing the main class, detecting a request for a requested class made by a referencing class, loading a class file associated with the requested class from a local storage device when the class file is stored on the local storage device and the requested class is not loaded in memory of the virtual machine, loading the class file from a class storage unit when the class file is not stored on the local storage device and the requested class is not loaded in the memory of the virtual machine, updating an application class graph (ACG) to record a dependency of the referencing class on the requested class, and updating an object table when the request is associated with creation of an object of the requested class.

18 Claims, 8 Drawing Sheets

(56) References Cited

OTHER PUBLICATIONS

Lau et al., "Code-on-demand and code adaptation for mobile computing," Draft, Department of Computer Science, The University of Hong Kong, 20 pages, retrieved Oct. 25, 2013, http://i.cs.hku.hk/~fcmlau/papers/cod.pdf.

Coward et al., "J2EE™ Client Provisioning Specification Version 1.0," Oracle publication, Aug. 27, 2003, 192 pages, http://download.oracle.com/otn-pub/jcp/j2ee_cp-1.0-fr-oth-jSpec/j2ee_cp-1_0-fr-spec.pdf.

Apache Maven from http://en.wikipedia.orq/wiki/Apache_Maven, 8 pages total, retrieved May 9, 2013.

\* cited by examiner

| Object ID | Referencing Class |
|---|---|
| 531 | com.ourco.ourclass |
| 532 | java.lang.String |
| ⋮ | ⋮ |

810 — Select an object from the heap

820 — Determine a class for the object

830 — Determine a referencing class for the object

840 — Update an edge in the ACG

850 — Remove an object table entry when the object is garbage collected

SYSTEM AND METHOD FOR DYNAMIC CLASS MANAGEMENT

BACKGROUND

The present disclosure relates generally to computing systems, and more particularly to dynamic class management.

As the value and use of information continues to increase, individuals and businesses seek additional ways to process and store information. One option is a computing system. Computing systems may vary in complexity from a single processor operating in relative isolation to large networks of interconnected processors. The interconnected processors may be in close proximity to each other or separated by great distances both physically and as distance is measured in computer networking terms. The interconnected processors may also work together in a closely cooperative fashion or in a loose weakly coupled fashion. Because technology and processing needs and requirements may vary between different applications, the structure and arrangement of the computing system may vary significantly between two different computing systems. The flexibility in computing systems allows them to be configured for both specific users, specific uses, or for more general purposes. Computing system may also include a variety of hardware and software components that may be configured to process, store, and communicate information based on the needs of the users and the applications.

Additionally, some examples of computing systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

In the early days of computing, software developers often created software components or software projects entirely by themselves. As the complexity of software projects increased, it often became undesirable and inefficient to create all the elements of these software projects. Instead, software developers often rely on software libraries and packages to provide many features and elements of software projects. Many of these software libraries and packages, themselves, rely on other software libraries and packages. Thus, in order to build or use a software project, the software developers and end users also need to have access to the relied upon software libraries and packages. During the build process, software libraries that are not known to be already located on a deployment platform where the software project is to be used are often bundled together and distributed as a group. This provides the benefit of distributing the software project with all of the software libraries and packages the software project depends on to the deployment platform together so that all the software components that may be used by the software project are available on the deployment platform. This may also introduce inefficiencies as software libraries and packages often include all the software components that might be needed to use the software libraries and packages even though, in many cases, all of the software components are typically not used or only rarely used.

Accordingly, it would be desirable to provide improved management of software components so as to avoid bundling unused software components.

SUMMARY

According to one example, a method of managing classes in a virtual machine includes starting a skeleton application by loading a main class of the skeleton application and executing the main class, detecting a request for a requested class made by a referencing class, loading a class file associated with the requested class from a local storage device when the class file is stored on the local storage device and the requested class is not loaded in memory of the virtual machine, loading the class file from a class storage unit when the class file is not stored on the local storage device and the requested class is not loaded in the memory of the virtual machine, updating an application class graph (ACG) to record a dependency of the referencing class on the requested class, and updating an object table when the request is associated with creation of an object of the requested class.

According to another example, a system for managing classes includes a deployment platform including a processor coupled to memory, a local storage device for storing one or more first class files, and a virtual machine being executed by the processor. The virtual machine includes a class loader, a heap scanner, a pruner, a heap, an application class graph (ACG), and an object table. The virtual machine starts a skeleton application by loading a main class of the skeleton application into the memory and executing the main class. The class loader detects a request for a requested class made by a referencing class, loads a class file associated with the requested class from the local storage device when the class file is stored on the local storage device and the requested class is not loaded in the memory, loads the class file from a class storage unit when the class file is not stored on the local storage device and the requested class is not loaded in the memory, updates the application class graph (ACG) to record a dependency of the referencing class on the requested class, and updates the object table when the request is associated with creation of an object of the requested class. The heap scanner selects a first object from the heap, determines a first class of the selected object, determines a first referencing class of the selected object using the object table and an object identifier associated with the selected object, and updates a first timestamp marking a directed dependency edge in the ACG from a class node corresponding to the first referencing class to the class node corresponding to the first class based on a current timestamp. The pruner detects a pruning event, determines a ranking for each class with a corresponding class node in the ACG, determines one or more second classes to prune based on the determined ranking, and deletes one or more class nodes corresponding to the one or more first classes and one or more directed dependency edges associated with the one or more first classes from the ACG.

According to yet another example, a non-transitory machine-readable medium comprising a first plurality of machine-readable instructions which when executed by one or more processors associated with one or more computing systems are adapted to cause the one or more processors to perform a method. The method includes beginning execution of a limited application by loading a main module of the limited application and executing a main function, detecting a call made by a first module to execute a portion of a second module, retrieving the second module from local storage and storing the second module in memory when the second module is found in the local storage and the second module is not stored in the memory, retrieving the second module from a module server and storing the second module in the memory when the second module is not found in the local storage and the second module is not stored in the memory, updating a module interrelationship structure to track a reliance of the first module on the second module, and updating an instance list when an instance of a type defined in the second module is instantiated by the first module.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Figure 1:
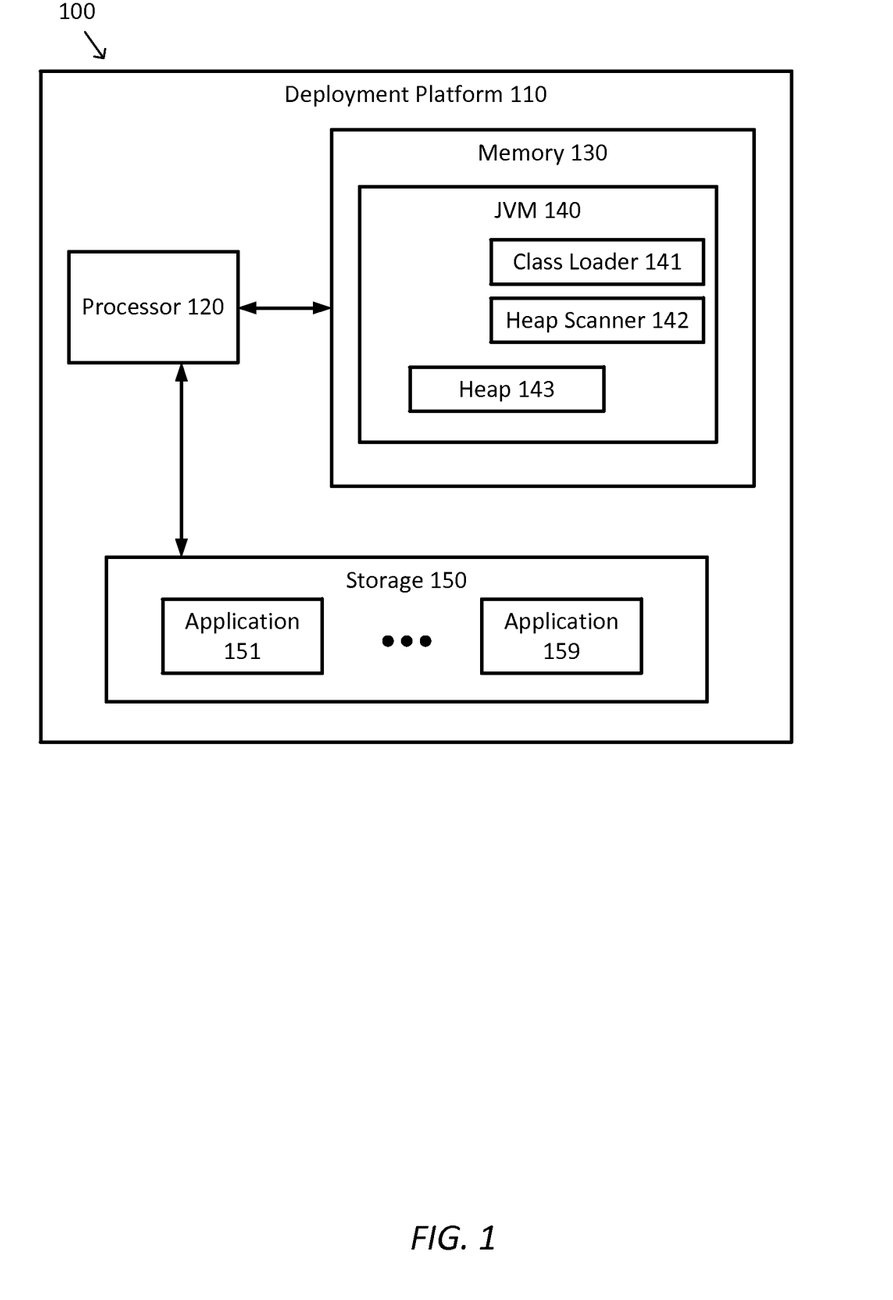
FIG. 1 is a simplified diagram of a computing system according to some examples.

FIG. 1 is a simplified diagram of a computing system 100 according to some examples. As shown in FIG. 1, computing system 100 includes a deployment platform 110. Deployment platform 110 is the target system on which a software project is intended to be executed. In some examples, deployment platform may be a standalone workstation, a cluster, a production server, within a virtual machine, and/or the like. Deployment platform 110 includes a processor 120 coupled to memory 130. In some examples, processor 120 may control operation and/or execution of software packages on deployment platform 110. Although only one processor 120 is shown, deployment platform 110 may include multiple processors. Memory 130 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 130 may further be used to store a Java virtual machine (JVM) 140. JVM 140 is a virtual machine capable of executing complied Java software. JVM 140 includes several components for managing, loading, and executing Java projects or applications. The components of the JVM 140 include a class loader 141 and a heap scanner 142. Class loader 141 is used to load any classes that are used while a Java project executes. These classes are typically distributed with an application using an archive file (not shown). In some examples, the archive file may be a Java Archive (JAR) file, a Web Archive (WAR) file, an Enterprise Archive (EAR) file, and/or the like. Heap scanner 142 is used to periodically scan a heap 143 associated with the JVM 140. Heap 143 is typically used by the JVM 140 to provide memory for software objects or instances of classes that are created or instantiated during execution of the Java project. When heap scanner 142 scans the heap, the heap scanner detects any objects that are no longer being used and frees up the memory associated with the objects so that the freed memory can be made available for use by other objects. In some examples, heap scanner 142 performs garbage collection.

Deployment platform 110 further includes storage 150. Storage 150 is typically separate from memory 130 and is often larger in capacity. In some examples, storage 150 may include one or more local storage devices. The local storage devices may include any kind of storage medium or machine-readable media. Some common forms of machine readable media suitable for the storage 150 may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. As shown in FIG. 1, storage 150 is storing a plurality of applications 151-159. In some examples, the applications 151-159 are Java applications. In some examples, the applications 151-159 may have been distributed to deployment platform 110 using a JAR file, a WAR file, an EAR file, and/or the like.

Figure 2:
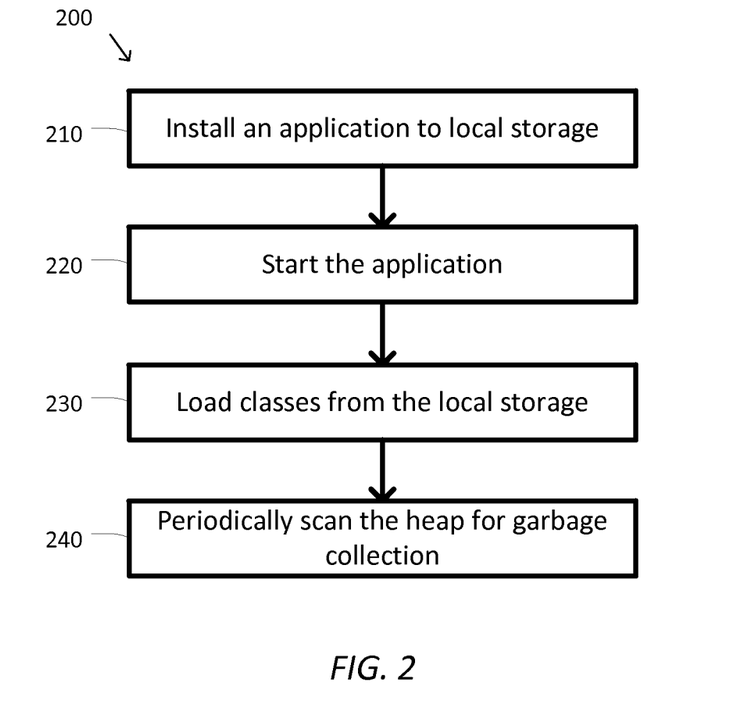
FIG. 2 is a simplified diagram of a method of application management according to some examples.

FIG. 2 is a simplified diagram of a method 200 of application management according to some examples. In some examples, one or more of the processes 210-240 of method 200 may be implemented, at least in part, in the form of executable code stored on non-transient, tangible, machine readable media that when run by one or more processors (e.g., the processors 120 of deployment platform 110) may cause the one or more processors to perform one or more of the processes 210-240.

At a process 210, an application is installed to local storage. An application to be run on a deployment platform, such as deployment platform 110, is installed to local storage in the deployment platform. In some examples, the local storage may be storage 150. In some examples, the application may include one or more software components bundled into a JAR file, a WAR file, an EAR file, and/or some other type of archive file. The one or more software components may include a main application program or main class and additional software libraries and/or packages that may be used by the main class either directly or indirectly. In some examples, the application is installed by extracting the software components and storing them on the local storage. For example, the extracted software components may include any number of Java class files, which each contain compiled Java software for a class. The application may be provided to the deployment platform using various methods including downloading the application from a server, copying it from a removable storage media device, and/or the like.

At a process 220, the application is started. In some examples, the application is started by loading the main class into a JVM, such as JVM 140, from the local storage and beginning execution of the main class.

At a process 230, classes are loaded from local storage. During execution of the application started during process 220, one or more classes that the main application class depends on either directly or indirectly are called by the executing code. For example, this may occur when an object of a class is created using the new operator or when a method of a class is called. When this occurs, the compiled software for that class is loaded into the JVM so it can be executed. This is typically handled by a class loader, such as class loader 141. Before loading a requested class, the class loader first determines whether the requested class is already loaded in the JVM. When the requested class is already loaded, it can be executed. However, when the requested class is not already loaded, the class loader may load it from the local storage where it was installed during process 210 as a class file. In some examples, directories of the local storage associated with one or more classpaths are searched for a class file corresponding to the class. Once loaded, the requested class may be executed. Use of the class loader permits the JVM to load those classes used during execution and avoid loading those classes that are not executed. This helps reduce memory resources required by the application within the JVM at the expense of delaying execution when the requested class needs to be loaded.

At a process 240, a heap is periodically scanned for garbage collection. As the application is executed, the heap of the JVM is periodically scanned to determine whether there are any objects that are no longer being used by the application. When a object is no longer being used by the application the memory associated with the object may be freed for use by other objects in a process often called garbage collection. For example, the garbage collection may be performed by heap scanner 142 on heap 143.

According to certain examples, computing system 100 and method 200 may not make efficient use of local storage, such as storage 150. Because the JAR, WAR, EAR, and/or other archive files typically include many of the software libraries and packages depended upon by the corresponding application, the archive files often include classes that are not used during execution of the application. In some examples, this may occur because the software libraries and packages are often overly inclusive so that they cover all the possibilities that may occur as the application executes. For example, an email library may, for the sake of completeness, include classes to support the post office protocol (POP) even though an application using the email library may not be used to access a server using POP. The inclusion of unused classes in the archive files causes the archive files and the installed class files to consume more storage space on the local storage. In some examples, the number of unused classes may be quite large causing some applications to consume more local storage resources than is necessary to support execution of the application. Thus, some type of dynamic management of the classes used by an application may be advantageous. However, the difficulty in this is that each time an application is executed, the classes used by the application may change. Further, when an application is left executing for an extended period of time, the application may have used some classes that are no longer in use and could be removed from the JVM and the local storage.

Figure 3:
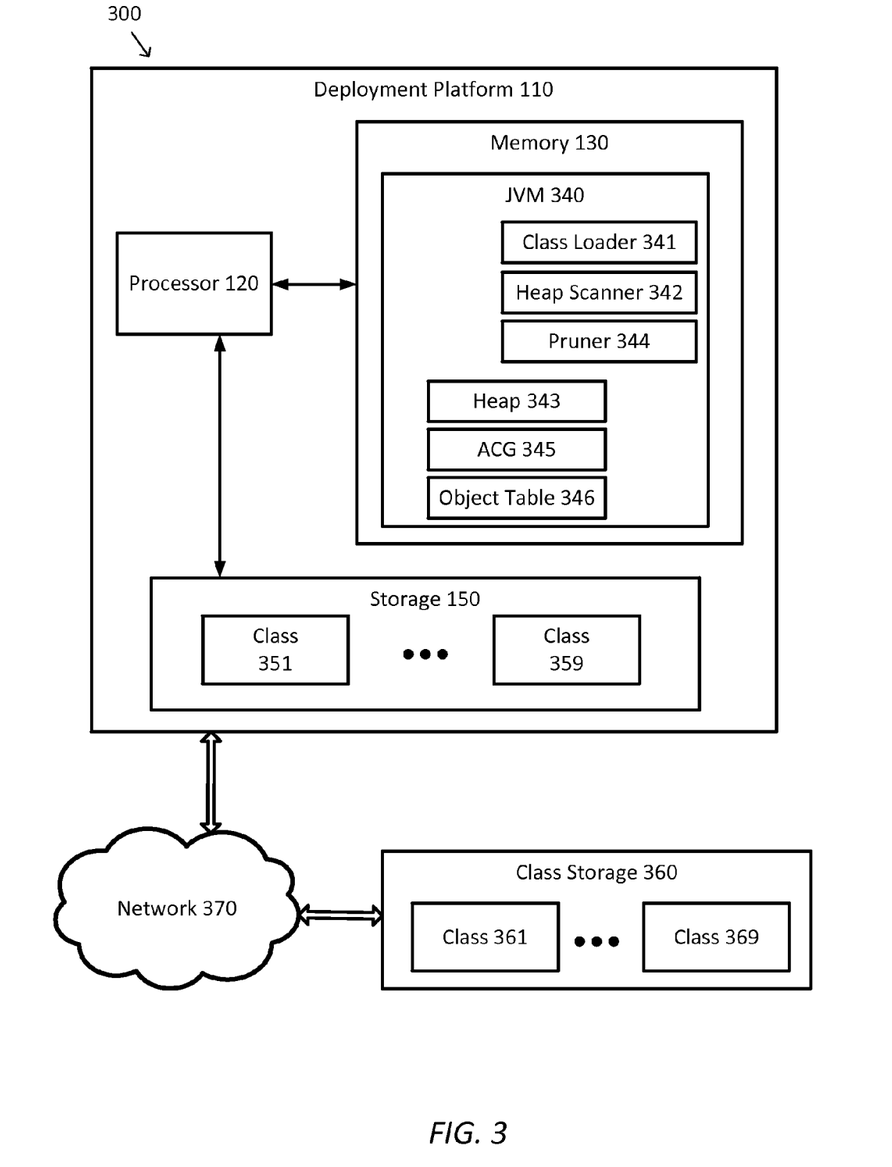
FIG. 3 is a simplified diagram of a computing system according to some examples.

FIG. 3 is a simplified diagram of a computing system 300 according to some examples. As shown in FIG. 3, computing system 300 includes the deployment platform 110. As with computing system 100, deployment platform 110 of computing system 300 includes processor 120, memory 130, and storage 150. In contrast, however, in computing system 300, deployment platform 110 is executing an enhanced JVM 340. Like JVM 140, enhanced JVM 340 includes several components for managing, loading, and executing Java projects or applications. The components of the enhanced JVM 340 include an enhanced class loader 341 and an enhanced heap scanner 342 as well as a pruner 344. Additionally, the memory of the enhanced JVM 340 includes a heap 343, an application class graph (ACG) 345, and an object table 346. As a further difference, storage 150 is used to store a plurality of class files 351-359 rather than the plurality of applications 151-159.

Enhanced class loader 341 operates similarly to class loader 141 except that enhanced class loader 341 is able to load classes either from class files stored in storage 150 (i.e., from the class files 151-159) or from class files 361-369 stored in a class storage unit 360 that may be coupled to deployment platform 110 using a network 370. For example, use of enhanced class loader 341 may help conserve resources of storage 150 because all the possible classes that may be used by an application do not have to be installed in storage 150, but may instead be loaded on demand from class storage unit 360. Use of class storage unit 360 may also conserve additional storage resources because class storage unit 360 may be shared among applications or even JVMs located in the same and/or different deployment platforms. Although only one class storage unit 360 is shown in FIG. 3, multiple class storage units may be coupled to deployment platform 110 using network 370 with the class files 361-369 being distributed among the multiple class storage units located on one or more class storage servers. In addition, use of multiple class storage units may provide redundancy that allows a class to be loaded from any of the multiple class storage units to address load balancing and/or to provide fail over support. Network 370 may be any type of network or combination of networks, including a local area network (LAN), such as an Ethernet, or a wide area network (WAN), such as the internet. Although shown separately from deployment platform 110 in FIG. 3, class storage unit 360 may instead be part of deployment platform 110.

Class storage unit 360 may further include machine readable media for storing the class files 361-369 and/or one or more processors (not shown). Some common forms of machine readable media suitable for the class storage unit 360 may include floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

Enhanced class loader 341 may also use memory 130 and/or storage 150 as a cache-like mechanism for class storage unit 360. For example, when enhanced class loader 341 loads a class file (e.g, one of the class files 361-369) from class storage unit 360, enhanced class loader 341 may make a copy of the corresponding class in memory 130 for use by the application being executed as well as by making a copy to be added to the class files 351-359 on storage 150.

According to certain examples, enhanced JVM 340 may further use pruner 344 to remove classes from memory 130 and/or storage 150 when those classes have not been used by the application for an extended period of time. In some examples, ACG 345 and object table 346 may be used to help track usage of each of the classes loaded into enhanced JVM 340 and/or stored in storage 150. In some examples, each application may be associated with its own ACG 345 and object table 346 or a common ACG 345 and object table 346 may be shared among all the applications being executed on enhanced JVM 340. In some examples, ACG 345 may be used to record interrelationships between classes.

Figure 4:
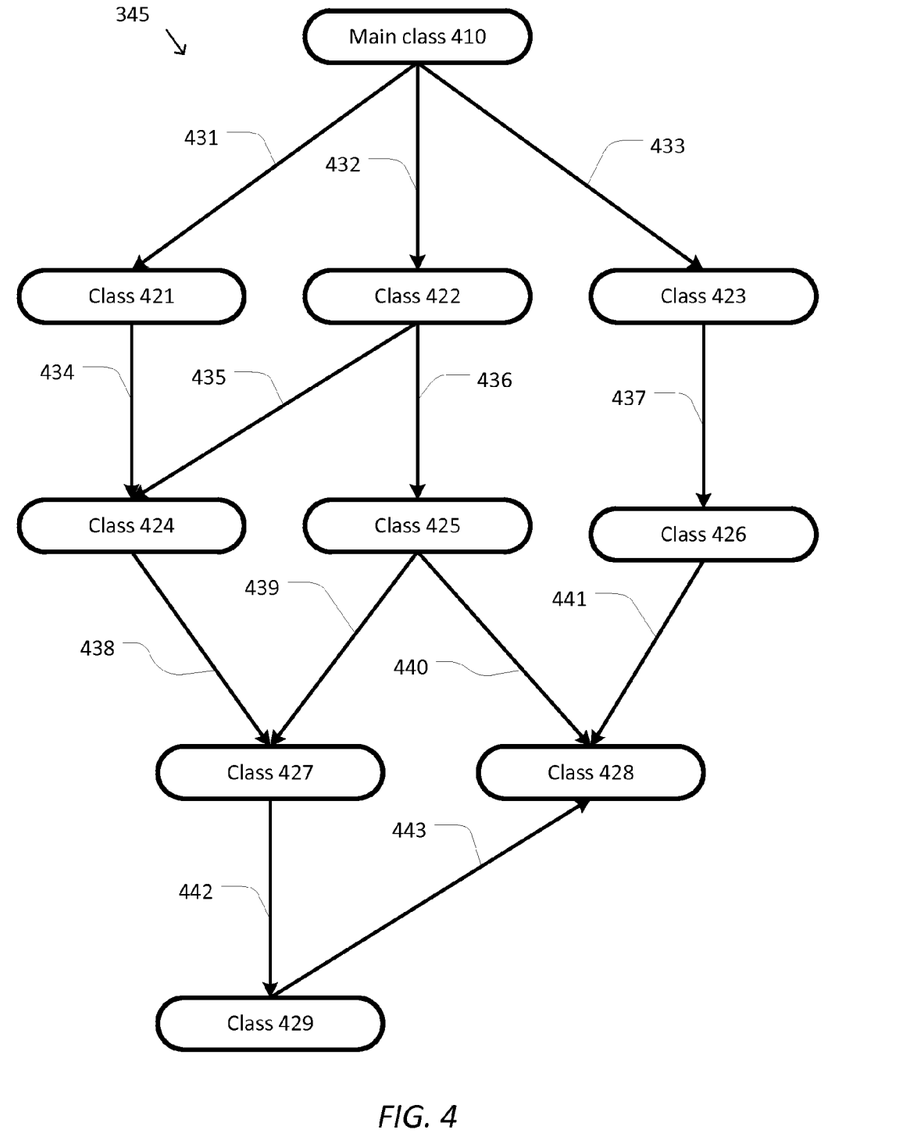
FIG. 4 is a simplified diagram of an application class graph according to some examples.

FIG. 4 is a simplified diagram of ACG 345 according to some examples. As shown in FIG. 4, ACG 345 includes a graph structure with a main class node 410, class nodes 421-429, and directed dependency edges 431-443. ACG 345 is used to track the interrelationships or dependencies between the classes being executed by enhanced JVM 340 and may be created by enhanced class loader 341. As enhanced class loader 341 loads classes on behalf of the applications executing in enhanced JVM 340, each dependency of a first class on a second class is represented by a directed dependency edge from the node corresponding to the first class to the node corresponding to the second class. Each of the directed dependency edges may be marked with a timestamp so that ACG 345 may be used to keep track of when the dependency was last used. Each of the class nodes may record a class name for the corresponding class, such as java.lang.String or com.ourco.ourclass. Although shown with 10 class nodes (main class node 410 and class nodes 421-429) and 13 directed dependency edges 431-443, ACG 345 may include as many or as few class nodes and directed dependency edges as there are classes and dependencies in the applications being executed on enhanced JVM 340.

As shown in FIG. 4, the main class is directly dependent upon three classes as represented by class nodes 421-423 and the directed dependency edges 431-433 from the main class node 410 to class nodes 421-423 respectively. The class corresponding to class node 421 is dependent upon the class corresponding to class node 424 as represented by directed dependency edge 434. Similarly, the class corresponding to class node 422 is also dependent upon the class corresponding to class node 424 as represented by directed dependency edge 435. Class nodes 425-429 and directed dependency edges 436-443 demonstrate other dependencies in ACG 345.

ACG 345 may be updated in several ways by enhanced class loader 341. When the application is first started and the main class begins execution, the main class node 410 is created and added to ACG 345. As the main class executes it may create or instantiate an instance of another class by using, for example, the new operator. As an example, when enhanced class loader 341 loads the class, the corresponding class node 421 is created and added to ACG 345 and the directed dependency edge 431 is added from main class node 410 to class node 421. Directed dependency edge 431 indicates that the main class is dependent upon the class corresponding to class node 421. Directed dependency edge 431 may also be marked with a timestamp corresponding to when class node 421 is created. As another example, new class node 422 may be created and added to ACG 345 when the main class calls a method of the class corresponding to class node 422. A directed dependency edge 432 is also added from the main class node 410 to class node 422 and marked with a corresponding timestamp. Whenever enhanced class loader 341 is asked to load a class, for example when new instances of the classes corresponding to class nodes 421 and 422 are created or methods are called, enhanced class loader 341 may make other updates to ACG 345. For example, when the main class creates a second instance of the class corresponding to class node 421, directed dependency edge 431 may be updated with a new timestamp. As another example, new directed dependency edges may be added to ACG 345 when new dependencies are discovered. When the dependency of the class corresponding to class node 422 on the corresponding to class node 424 is determined, class node 424 and directed dependency edge 435 may be created and added to ACG 345. When the dependency of the class corresponding to class node 421 on the class corresponding to class node 424 is determined, directed dependency edge 434 may be created and added to ACG 345 from class node 421 to class node 424. As each of the dependencies are detected by enhanced class loader 341, ACG 345 is updated to add class nodes and/or directed dependency edges as well as to update any timestamps. Thus, ACG 345 may be used to keep track of the most recent use of each dependency.

Figure 5:
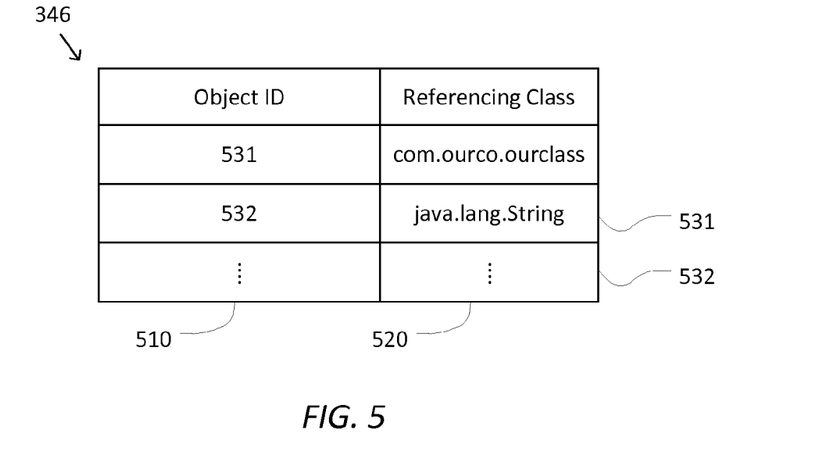
FIG. 5 is a simplified diagram of an object table according to some examples.

FIG. 5 is a simplified diagram of object table 346 according to some examples. As shown in FIG. 5, object table 346 includes entries for cross referencing instances of classes with dependencies recorded in ACG 345. Each object, type instance, or class instance created in Java is typically associated with an object identifier (ID). For example, the object identifier may be associated with a memory address where the corresponding object is stored. Using the object identifier, an API, such as the reflection API, or a method, such as getCanonicalName, may be used to determine the class of which the corresponding object is an instance of. This information is not sufficient to uniquely identify a dependency in ACG 345 because any given class may be depended upon by many other classes. Object table 346 solves this problem.

Object table 346 includes an object ID field 510 for recording the object ID of the corresponding object and a referencing class field 520 for recording a class name or other identifier for the referencing class. Entries in object table 346 associate each object ID with the class referencing the corresponding object. Object table 346 includes two representative object table entries 531 and 532. Entry 531 associates object ID 531 with the class com.ourco.ourclass and entry 532 associates object ID 532 with the String class. In some examples, enhanced class loader 341 may create an object table entry whenever it is asked to load a class in response to use of the new operator. In some examples, the new operator may be enhanced to create the object table entry. As an example, entry 531 may be created when the com.ourco.ourclass class creates an instance of the java.sql.Date class with the object ID of 531. Although represented in table form, object table 346 may use any suitable data structure for recording the relationships between object IDs and the corresponding classes referencing them. For example, key-value pairs and/or database tables may be used to store object table 346. In some examples, object table 346 may be indexed based on the values stored in the object ID field 510. In some instances, other collection-type data structures, such as a list, may be used for object table 346.

Referring back to FIG. 3, enhanced heap scanner 342 may also be used to maintain ACG 345 and object table 346 when enhanced heap scanner 342 performs its periodic scan of heap 343 for the purposes of garbage collection. For example, as each object on heap 343 is examined, enhanced heap scanner 342 may use the corresponding object ID to determine both a class of the object using the reflection API or the getCanonicalName or getName methods and the referencing class using object table 346. Once both the class and the referencing class are determined, a corresponding directed dependency edge in ACG 345 may be updated with a timestamp representing the current time. Thus, as objects are examined for the purpose of garbage collection, the dependencies in ACG 345 are updated to indicate ongoing reliance on the dependency. Enhanced heap scanner 342 may additionally remove object table entries corresponding to objects whose memory is freed as part of the ongoing garbage collection.

In order to reduce usage of resources associated with memory 130 and/or storage 150, pruner 344 may be used to remove classes that are no longer depended upon from memory 130 and/or storage 150. For example, when no more instances of a class are stored in the heap and no methods of the class are called for an extended period of time, this may indicate that the class is no longer being used and may be removed from memory 130 and/or storage 150. To select classes for removal, pruner 344 may determine which classes are least recently used based on the timestamps recorded in ACG 345. For example, pruner 344 may apply a weighted sum or other aggregation function to the timestamps marking each of the directed dependency edges directed to a class node to determine an aggregate ranking for the class corresponding to the class node. As an example, an aggregate ranking for the class corresponding to class node 428 may be computed based on the timestamps marking the directed dependency edges 440, 441, and 443. Once the aggregate rankings are determined, pruner 344 may then remove all classes with an aggregate ranking below a user or a system specified threshold or remove the classes with the lowest aggregate rankings until sufficient resources of memory 130 and/or storage 150 are made available. Pruner 344 may further remove the corresponding class nodes and directed dependency edges from ACG 345.

Figure 6:
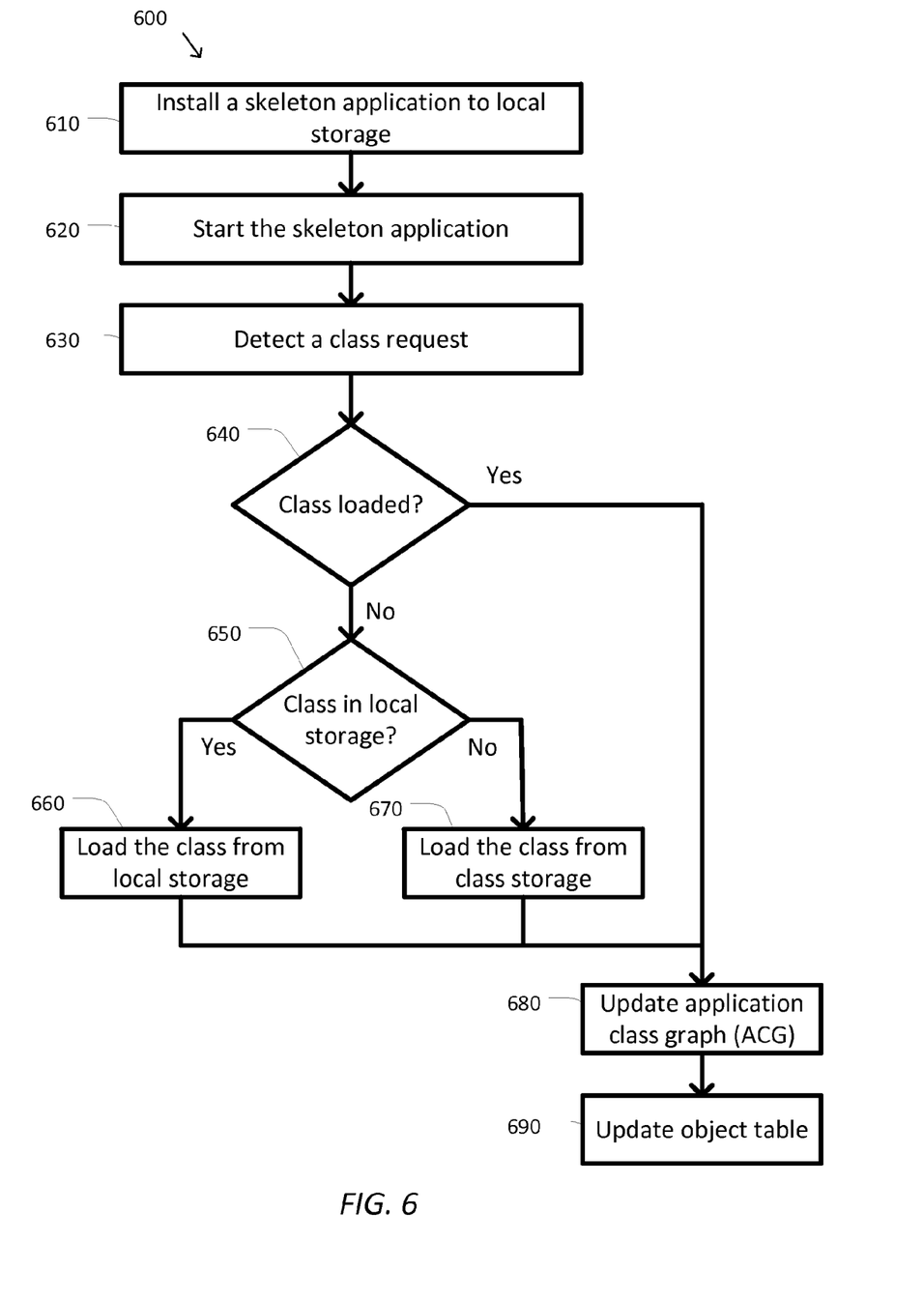
FIG. 6 is a simplified diagram of a method of application management according to some examples.

FIG. 6 is a simplified diagram of a method 600 of application management according to some examples. In some examples, one or more of the processes 610-690 of method 600 may be implemented, at least in part, in the form of executable code stored on non-transient, tangible, machine readable media that when run by one or more processors (e.g., the processor 120 of deployment platform 110) may cause the one or more processors to perform one or more of the processes 610-690.

At a process 610, a skeleton application is installed to local storage. Unlike process 210, which installs an entire application to local storage, in process 610 only a limited or skeleton application that is a subset of a larger application is installed to the local storage. In some examples, the local storage may be storage 150. The skeleton application may include a subset of the software components for the larger application in an archive file. In some examples, the archive file may be a JAR file, a WAR file, an EAR file, and/or some other type of archive file. The subset of software components may include a main application program or main class and a limited number or possibly even no additional software libraries and/or packages as any additional classes depended upon by the skeleton application or the larger application may be loaded on demand when needed. In some examples, the skeleton application is installed by extracting the software components in the archive file and storing them on the local storage as class files. The skeleton application may be provided to the deployment platform using various methods including downloading the skeleton application from a server, copying it from a removable storage media device, and/or the like.

At a process 620, the skeleton application is started. In some examples, the skeleton application is started by loading the main class into a JVM, such as JVM 340, from the local storage and beginning execution of the main class. In some examples, the skeleton application is started by loading a main module containing a main function and executing the main function.

At a process 630, a class request is detected. During execution of the application started during process 220, one or more classes that the main application class depends on either directly or indirectly are called by the executing code. For example, this may occur when an object of a class is created using the new operator or when a method of a class is called. When this occurs, the compiled software for that class is loaded into the JVM so it can be executed. The class loading may be handled by a class loader, such as enhanced class loader 341.

At a process 640, it is determined whether the class is already loaded. The class loader may first determine whether the class requested during process 630 is already loaded into the memory of the JVM. In some examples, the class loader may examine one or more data structures, such as a catalog, to determine whether the requested class is already loaded. When the requested class is already loaded, an ACG and an object table are updated using processes 680 and 690. When the requested class is not already loaded, a location of the corresponding class file is determined using a process 650.

At the process 650, it is determined whether the requested class is located in the local storage. In some examples, the class loader may examine one or more data structures, such as a catalog, to determine whether a class file corresponding to the requested class is stored in the local storage. In some examples, directories of the local storage associated with one or more classpaths are searched for a class file corresponding to the class. In some examples, the class file may have been stored in the local storage during process 610 or as a result of a prior class request detected during process 630. When the requested class is located in the local storage, the requested class is loaded from the local storage using a process 660. When the requested class is not located in the local storage, the requested class is loaded from class storage using a process 670.

At the process 660, the requested class is loaded from the local storage. For example, the class file corresponding to the requested class may be read from one of the classpath directories in the local storage. After the requested class is loaded, the ACG and the object table are updated using processes 680 and 690.

At the process 670, the requested class is loaded from class storage. When the requested class is not already loaded or stored in the local storage, the requested class is loaded from class storage, such as class storage unit 360. In order to determine the location of the class and the class storage, the archive file containing the skeleton application may include one or more dependency descriptors describing the location of classes and the class storage. In some examples, the dependency descriptors may include a uniform resource locator (URL) for one or more class storage units. In some examples, the dependency descriptors may be Maven dependency descriptors. In some examples, the class is loaded by requesting the class from the class storage using one or more messages, remote procedure calls, web services, and/or the like. After the requested class is loaded, the ACG and the object table are updated using processes 680 and 690.

Figure 7:
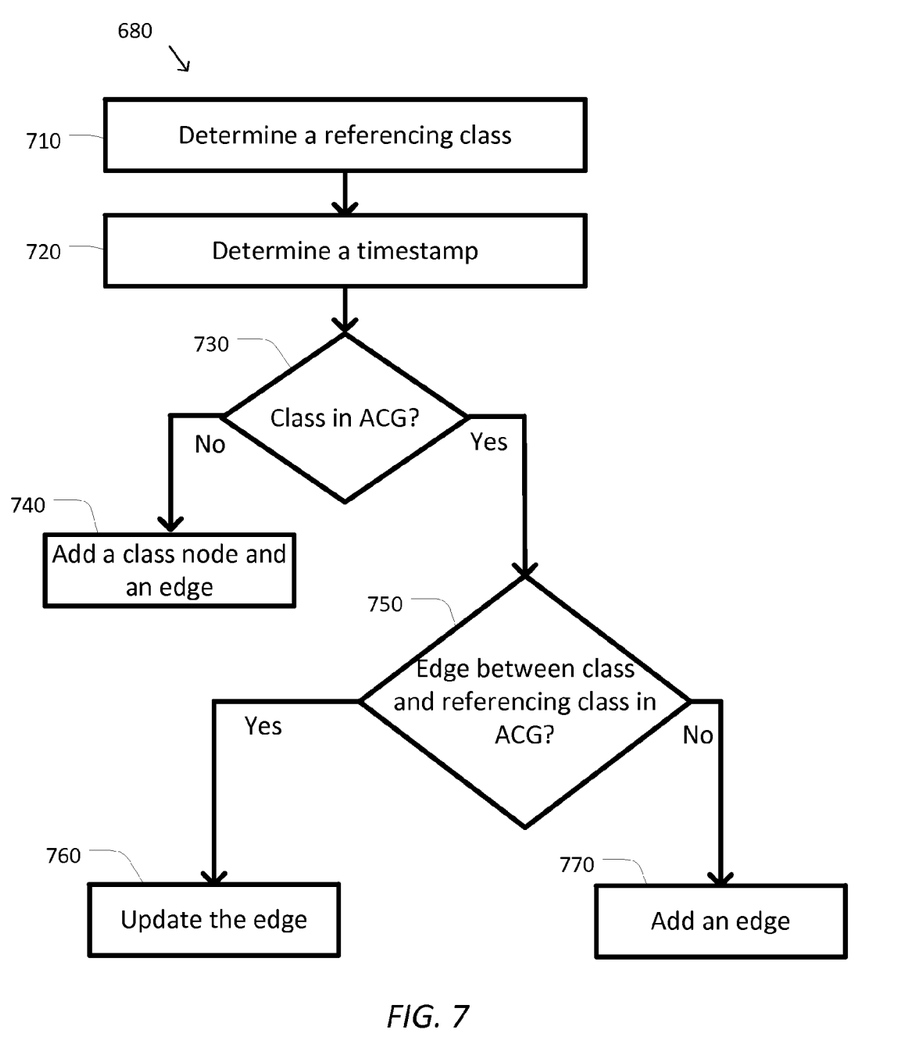
FIG. 7 is a simplified diagram of a process for updating an application class graph according to some examples.

FIG. 7 is a simplified diagram of the process 680 for updating the ACG according to some examples. As shown in FIG. 7, process 680 includes various processes for creating and adding class nodes to the ACG and creating, adding, and updating directed dependency edges to the ACG. In some examples, the ACG may be ACG 345.

At a process 710, a referencing class is determined. When the class request is detected during process 630, code in the referencing class is executed which uses the new operator to create an instance of the requested class or calls a method of the requested class. For example, the class loader or the JVM may determine the referencing class using the reflection API or the getCanonicalName or getName methods.

At a process 720, a timestamp is determined. The timestamp indicates an approximate time when the class request detected during process 630 occurred. In some examples, the timestamp may be based on a current time being maintained by processor 120 or by enhanced JVM 340. In some example, the timestamp may be determined using the Date or a similar class.

At a process 730, it is determined whether a class node corresponding to the requested class is already in the ACG. The ACG may be examined to determine whether a class node corresponding to the requested class is present in the ACG. For example, a lookup operation may be used. In some examples, the lookup operation may compare a class name of the requested class with the class name recorded in each of the class nodes in the ACG. When the corresponding class node is not found in the ACG, a class node and a directed dependency edge are added to the ACG using a process 740. When the corresponding class node is found in the ACG, the ACG is further examined beginning with a process 750.

At the process 740, a class node and a directed dependency edge are added to the ACG. When a class node corresponding to the requested class is not found in the ACG this means that the ACG does not include any dependencies on the requested class and a class node corresponding to the requested class is created and then added to the ACG. Once the class node is added to the ACG, a directed dependency edge is added from the class node corresponding to the referencing class determined during process 710 and the newly added class node. The directed dependency edge is marked with the timestamp determined during process 720. For example, when the main class creates a first instance of the class corresponding to class node 421 in ACG 345, the class node 421 is created and then added to ACG 345. Directed dependency edge 431 is then created and added from the main class node 410 to class node 421 and marked with the timestamp. By adding the new class node and the new directed dependency edge to the ACG, the corresponding dependency just determined is recorded in the ACG along with a time when the dependency is used or relied upon.

At the process 750, it is determined whether a directed dependency edge between the class node corresponding to the requested class and the class node corresponding to the referencing class is already in the ACG. The ACG may be examined to determine whether a directed dependency edge is already present from the class node corresponding to the referencing class and the class node corresponding to the requested class. When the directed dependency edge is already in the ACG, the directed dependency edge is updated using a process 760. When the directed dependency edge is not already in the ACG, the directed dependency edge is created and added using a process 770.

At the process 760, the directed dependency edge is updated. The directed dependency edge from the class node corresponding to the referencing class to the class node corresponding to the requested class is updated by marking the directed dependency edge with the timestamp determined during process 720. By updating the directed dependency edge with the timestamp, the time of the last known use of or reliance on (i.e., the current use of or reliance on) the corresponding dependency is updated.

At the process 770, a directed dependency edge is added to the ACG. A directed dependency edge from the class node corresponding to the referencing class to the class node corresponding to the requested class is created and added to the ACG and is marked with the timestamp determined during process 720. In this way the time of the last known use of or reliance on (i.e., the current use of or reliance on) the corresponding dependency is recorded in the ACG.

Referring back to FIG. 6, at the process 690 the object table is updated. To support updating of the ACG by a heap scanner, such as enhanced heap scanner 342, an object table, such as object table 346 is updated when new instances of a class are created. For example, this may occur whenever the new operator is used. When the new instance of the class is created a corresponding entry is created and added to the object table with an object ID corresponding to the new instance and the referencing class that had the new instance created. For example, the referencing class may be the referencing class determined during process 710. The created and added entry may assist the heap scanner in determining a directed dependency edge corresponding to the new instance of the class.

Figure 8:
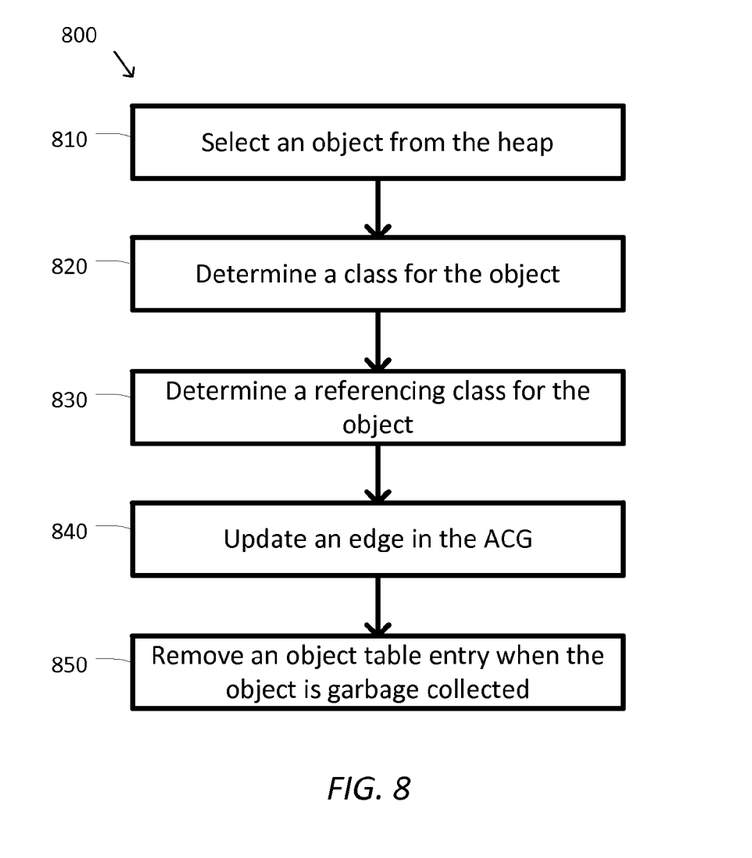
FIG. 8 is a simplified diagram of a method of heap scanning according to some examples.

FIG. 8 is a simplified diagram of a method 800 of heap scanning according to some examples. In some examples, one or more of the processes 810-850 of method 800 may be implemented, at least in part, in the form of executable code stored on non-transient, tangible, machine readable media that when run by one or more processors (e.g., the processor 120 of deployment platform 110) may cause the one or more processors to perform one or more of the processes 810-850. In some examples, method 800 may be performed in addition to other garbage collection processes being performed by a heap scanner, such as enhanced heap scanner 342.

At a process 810, an object is selected from the heap. As the heap scanner examines each of the objects (i.e., instances of classes), each object is selected in turn for processing.

At a process 820, a class for the selected object is determined. For example, an object ID corresponding to the selected object may be determined and then used with the reflection API or the getCanonicalName or getName methods to determine the class for the selected object.

At a process 830, a referencing class for the selected object is determined. For example, the object ID determined during process 820 may be used to look up the referencing class using an object table, such as object table 346.

At a process 840, an edge in the ACG is updated. Using the class determined during process 820 and the referencing class determined during process 830, a directed dependency edge from the ACG, such as ACG 345 may be determined. The determined directed dependency edge may be updated by marking the directed dependency edge with a timestamp corresponding to the current time. For example, a process similar to process 720 may be used to determine the timestamp. By updating the directed dependency edge with the current time, the continued reliance on the dependency due to the continued existence of the object determined during process 810 is recorded in the ACG. In some examples, when the directed dependency edge is not found in the ACG, process 840 may be omitted or a directed dependency edge may be created and added using a process similar to process 770. In some examples, when the selected object is to be deleted as part of the garbage collection processes of the heap scanner, process 840 may be omitted.

At a process 850, an object table entry is removed when the object is garbage collected. When the garbage collection processes of the heap scanner determine that the selected object is to be deleted and the corresponding memory freed, the object table entry corresponding to the selected object may be removed from the object table. This avoids cluttering up the object table with objects that no longer exist.

Figure 9:
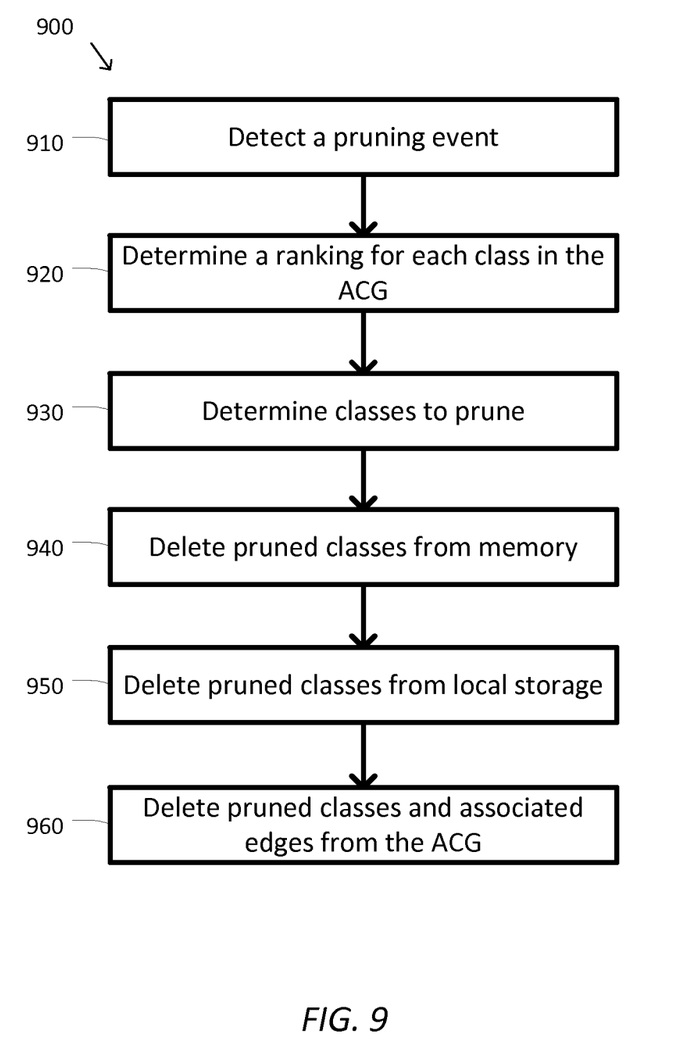
FIG. 9 is a simplified diagram of a method of class pruning according to some examples.

FIG. 9 is a simplified diagram of a method 900 of class pruning according to some examples. In some examples, one or more of the processes 910-960 of method 900 may be implemented, at least in part, in the form of executable code stored on non-transient, tangible, machine readable media that when run by one or more processors (e.g., the processor 120 of deployment platform 110) may cause the one or more processors to perform one or more of the processes 910-960. In some examples, method 900 may be performed by a pruner, such as pruner 344.

At a process 910, a pruning event is detected. The pruning event may occur whenever memory and/or storage resources for storing classes become insufficient. For example, a JVM, such as enhanced JVM 340, may allocate a fixed amount of memory for the storage of classes being used by applications being executed in the JVM. When too much of the memory is being used to store classes, it may be desirable to remove or prune classes from the memory that are no longer needed or being used, rather than rely on virtual memory, other swap space approaches, or dynamically increasing the amount of memory. For example, a threshold amount of memory may be used to trigger a pruning event. In some examples, the threshold may represent an absolute amount of memory (e.g., only a threshold amount of memory, or less, remains available) or a percentage amount (e.g., only a threshold percentage of memory, or less, remains available). Similarly, the pruning event may be associated with when a threshold amount of local storage, such as storage 150, remains available for storing class files. As with the memory threshold, the local storage pruning event may use an absolute or percentage threshold. In some examples, the threshold values may be set by configuration or by a dynamic determination. In some examples, the pruning event may be detected whenever a class is retrieved from class storage, such as class storage unit 360, and stored to memory and/or local storage.

At a process 920, a ranking is determined for each class in the ACG. Several possible approaches for selecting classes for pruning from the memory or the local storage may be used. Many begin by ranking the classes to determine which classes are better candidates for pruning. For example, classes loaded the longest may be pruned first, but this approach may inefficiently prune heavily used classes such as java.lang.String. Another approach is to prune classes that are the least recently used. This approach favors pruning classes that have gone the longest without being used and/or depended upon.

The ACG may be used to aid in the ranking of classes. Using the timestamps marking each of the directed dependency edges of the ACG an approximate indication of when each of the dependencies was used and/or relied upon may be determined. Classes that have not been used recently may not have been processed by a class loader, such as enhanced class loader 341, so that none of the directed dependency edges directed to the class will have a recent timestamp. Similarly, classes that do not have instances will not have directed dependency edges that have been recently updated by a heap scanner, such as enhanced heap scanner 342.

One potential complication may be that any of the classes in the ACG may have multiple directed dependency edges. The multiple timestamps marking the multiple directed dependency edges may be aggregated using an aggregation function, such as a weighted sum. Equation 1 describes one possible function for aggregating multiple timestamps. Equation 1 uses a maximum interval B to limit any bias caused by timestamps that are very old and to generate a ranking in the range of 0 to 1. Maximum interval may be set by configuration or determined dynamically based on how often classes are loaded by the class loader or some other measures.

$$\text{rank} = \frac{\sum_{i=1}^{n}(B - \min(T_i, B))}{nB} \quad \text{Eqn. 1}$$

Where n is a number of directed dependency edges directed to the class whose rank is being determined and $T_i$ is a timestamp marking the corresponding directed dependency edge. In some examples, Equation 1 may be used to rank each of the classes having corresponding class nodes in the ACG.

At a process 930, the classes to prune are determined. Using the rankings determined during process 920, the classes to prune may be determined Classes with a poorer ranking may be better candidates for pruning. For example, when Equation 1 is used, classes with ranks closer to 0.0 have a poorer ranking than classes with ranks closer to 1.0. One approach for determining the classes to be pruned is to remove any classes with a rank below a threshold where the threshold may be configured or determined dynamically. For example, using Equation 1, the threshold may be 0.4. Another approach for determining the classes to be pruned is to being pruning classes with the poorest rankings until sufficient memory resources and/or local storage resources are recovered. For example, classes may be pruned until the threshold associated with the pruning event detected during process 910 plus some hysteresis is obtained.

At a process 940, the pruned classes are deleted from memory. For example, when the pruning event detected during process 910 is related to memory resources, the pruned classes may be removed from the class memory of the JVM.

At a process 950, the pruned classes are deleted from local storage. For example, when the pruning event detected during process 910 is related to local storage resources, the pruned classes may be removed from the local storage.

According to certain examples, various combinations of processes 940 and 950 may be used to delete classes from memory and/or local storage. In some examples, the pruned classes are only deleted from memory. In some examples, the pruned classes are only deleted from local storage. In some examples, the pruned classes are deleted from both memory and local storage. In some examples, the decision of whether to delete a pruned class from memory, local storage, or both may be made on an individual class basis.

At a process 960, the pruned classes and associated directed dependency edges may be deleted from the ACG. Once a pruned class is deleted during processes 940 and/or 950 it may no longer be necessary to keep track of the pruned class using the ACG. For example, should an application later generate a class request for the pruned class, the class loader may reload the pruned class and make the corresponding updates to the ACG. The pruned class may be deleted from the ACG by deleting the corresponding class node and deleting any directed dependency edges directed to or from the corresponding class node. In some examples, process 960 may only delete the class node and associated directed dependency edges when both processes 940 and 950 are used to delete both the memory and local storage copies of the class.

Some examples of deployment platform 110 and/or class store 360 may include non-transient, tangible, machine readable media that include executable code that when run by one or more processors (e.g., processor 120) may cause the one or more processors to perforin the processes of methods 200, 600, 800, and/or 900 as described above. Some common forms of machine readable media that may include the processes of methods 200, 600, 800, and/or 900 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

As discussed above and further emphasized here, FIGS. 1-9 are merely examples which should not unduly limit the scope of the claims. One of ordinary skill in the art would recognize many variations, alternatives, and modifications. In some examples, programming languages other than Java may be used. In some examples, JVM 140 and enhanced JVM 340 may be some other type of virtual machine. In some examples, the granularity of managed components in ACG 345 and methods 200, 600, 800, and/or 900 may be different than that of classes. For example, the components may be managed at the function, file, library, and/or some other suitable level of component aggregation. In some examples, Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing classes in a virtual machine, the method comprising:
   starting a skeleton application by loading a main class of the skeleton application and executing the main class;
   detecting a request for a requested class made by a referencing class;
   loading a class file associated with the requested class from a local storage device when the class file is stored on the local storage device and the requested class is not loaded in memory of the virtual machine;
   loading the class file from a class storage unit when the class file is not stored on the local storage device and the requested class is not loaded in the memory of the virtual machine;
   updating an application class graph (ACG) to record a dependency of the referencing class on the requested class;
   updating an object table when the request is associated with creation of an object of the requested class;
   selecting a first object from a heap of the virtual machine;
   determining a first class of the selected object;
   determining a first referencing class of the selected object using the object table and an object identifier associated with the selected object;
   updating a timestamp marking a directed dependency edge in the ACG from a class node corresponding to the first referencing class to the class node corresponding to the first class based on a current timestamp; and
   removing an entry corresponding to the selected object from the object table when the selected object is deleted during garbage collection.

2. The method of claim 1 wherein updating the ACG comprises:
   determining a timestamp associated with the request;
   adding a requested class node corresponding to the requested class to the ACG when the requested class node is not found in the ACG;
   adding a directed dependency edge from a referencing class node corresponding to the referencing class to the requested class node when the directed dependency edge is not found in the ACG;
   updating the directed dependency edge when the directed dependency edge is found in the ACG; and
   marking the directed dependency edge with the timestamp.

3. The method of claim 2 wherein the requested class node includes a class name of the requested class and the referencing class node includes a class name of the referencing class.

4. The method of claim 1 wherein updating the object table comprises:
   creating an object table entry including an object identifier of the created object of the requested class and information associated with the referencing class.

5. The method of claim 4 wherein the information associated with the referencing class includes a class name of the referencing class.

6. The method of claim 1 wherein the request is associated with an event selected from a group consisting of creation of an object of the requested class and calling a method of the requested class.

7. The method of claim 6 wherein creation of an object of the requested class is associated with a use of a new operator.

8. The method of claim 1 wherein loading the class file from the class storage unit includes requesting the class file over a network based on information associated with a dependency descriptor.

9. The method of claim 1 wherein the class storage unit comprises one or more class storage servers.

10. The method of claim 1, further comprising:
    detecting a pruning event;
    determining a ranking for each class with a corresponding class node in the ACG;
    determining one or more first classes to prune based on the determined ranking;
    deleting the one or more first classes; and
    deleting one or more class nodes corresponding to the one or more first classes and one or more directed dependency edges associated with the one or more first classes from the ACG.

11. The method of claim 10 wherein deleting the one or more first classes comprises deleting the one or more first classes from the memory of the virtual machine.

12. The method of claim 10 wherein deleting the one or more first classes comprises deleting one or more first class files associated with the one or more first classes from the local storage device.

13. The method of claim 10 wherein the pruning event is associated with reaching or exceeding a storage threshold.

14. The method of claim 10 wherein determining a ranking for a second class comprises computing a weighted sum based on information associated with timestamps marking directed dependency edges directed towards a second class node corresponding to the second class.

15. The method of claim 14 wherein the weighted sum is further based on a maximum interval.

16. A system for managing classes, the system comprising:
    a deployment platform including a processor coupled to memory;
    a local storage device for storing one or more first class files; and
    a virtual machine being executed by the processor;
    wherein:
       the virtual machine includes a class loader, a heap scanner, a pruner, a heap, an application class graph (ACG), and an object table;

the virtual machine starts a skeleton application by loading a main class of the skeleton application into the memory and executing the main class;

the class loader detects a request for a requested class made by a referencing class, loads a class file associated with the requested class from the local storage device when the class file is stored on the local storage device and the requested class is not loaded in the memory, loads the class file from a class storage unit when the class file is not stored on the local storage device and the requested class is not loaded in the memory, updates the application class graph (ACG) to record a dependency of the referencing class on the requested class, and updates the object table when the request is associated with creation of an object of the requested class;

the heap scanner selects a first object from the heap, determines a first class of the selected object, determines a first referencing class of the selected object using the object table and an object identifier associated with the selected object, and updates a first timestamp marking a directed dependency edge in the ACG from a class node corresponding to the first referencing class to the class node corresponding to the first class based on a current timestamp; and the pruner detects a pruning event, determines a ranking for each class with a corresponding class node in the ACG, determines one or more second classes to prune based on the determined ranking, and deletes one or more class nodes corresponding to the one or more second classes and one or more directed dependency edges associated with the one or more second classes from the ACG.

17. The system of claim 16, wherein the class loader further determines a second timestamp associated with the request, adds a requested class node corresponding to the requested class to the ACG when the requested class node is not found in the ACG, adds a directed dependency edge from a referencing class node corresponding to the referencing class to the requested class node when the directed dependency edge is not found in the ACG, updates the directed dependency edge when the directed dependency edge is found in the ACG, and marks the directed dependency edge with the second timestamp.

18. A non-transitory machine-readable medium comprising a first plurality of machine-readable instructions which when executed by one or more processors associated with one or more computing systems are adapted to cause the one or more processors to perform a method comprising:

beginning execution of a limited application by loading a main module of the limited application and executing a main function;

detecting a call made by a first module to execute a portion of a second module;

retrieving the second module from local storage and storing the second module in memory when the second module is found in the local storage and the second module is not stored in the memory;

retrieving the second module from a module server and storing the second module in the memory when the second module is not found in the local storage and the second module is not stored in the memory;

updating a module interrelationship structure to track a reliance of the first module on the second module;

updating an instance list when an instance of a type defined in the second module is instantiated by the first module;

selecting a first object from a heap of the virtual machine;

determining a first class of the selected object;

determining a first referencing class of the selected object using the object table and an object identifier associated with the selected object;

updating a timestamp marking a directed dependency edge in the module interrelationship structure from a class node corresponding to the first referencing class to the class node corresponding to the first class based on a current timestamp; and removing an entry corresponding to the selected object from the object table when the selected object is deleted during garbage collection.

\* \* \* \* \*